United States Patent [19]
Inoue et al.

[11] Patent Number: 6,144,835
[45] Date of Patent: *Nov. 7, 2000

[54] IMAGE FORMING APPARATUS INCLUDING MEANS FOR WARNING AN OPERATOR OF A POTENTIAL ILLEGAL COPYING OPERATION BEFORE THE COPYING OPERATION AND METHOD OF CONTROLLING THE SAME

[75] Inventors: Toru Inoue, Atsugi; Toshihisa Motosugi, Okazaki, both of Japan

[73] Assignee: Minolta, Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/017,132

[22] Filed: Feb. 2, 1998

[30] Foreign Application Priority Data

Feb. 5, 1997 [JP] Japan ..................................... 9-022532
Jul. 9, 1997 [JP] Japan ..................................... 9-184106

[51] Int. Cl.$^7$ ................................................... G03G 21/04
[52] U.S. Cl. .............................. 399/366; 399/81; 283/902
[58] Field of Search ..................... 399/81, 366; 283/902, 283/72, 73, 74, 75, 76, 77

[56] References Cited

U.S. PATENT DOCUMENTS

| | | | |
|---|---|---|---|
| 5,182,599 | 1/1993 | Kinoshita | 355/208 |
| 5,216,724 | 6/1993 | Suzuki et al. | 382/7 |
| 5,321,470 | 6/1994 | Hasuo et al. | 355/3 |
| 5,440,409 | 8/1995 | Sugano et al. | 358/501 |

FOREIGN PATENT DOCUMENTS 08079510  3/1996  Japan ............................... H04N 1/40

*Primary Examiner*—Richard Moses
*Attorney, Agent, or Firm*—Morrison & Foerster, LLP

[57] ABSTRACT

When an operator starts an operation for copying in full-color image forming mode, a predetermined warning to copy-protected materials and others is given to the operator, and an actual copy cannot be performed unless the operator confirms this warning. When the operator starts the operation of copying in the full-color image forming mode, and/or during the copying operation, a third party such as a manager of the copying machine is notified of these facts for enabling help in the copying operation and finding the copying of copy-protected materials.

42 Claims, 11 Drawing Sheets

Fig. 6

FULL-COLOR STANDARD (1)

SET COPY MODE through screen — 1

FINISH OF COPY
- FULL-COLOR — COPY IN FULL-COLOR
- MONO-COLOR — COPY IN ONE OF RED, BLUE, GREEN···
- MONOCHROME — FOR MONOCHROME ORIGINAL (NOTE, TEXT, ···)

↓ Full-color is selected.
(2) ↓ (Full-color key is touched.)

NO COPY OF BILLS

COPYING (IMITATION) OF BILLS (PAPER MONEYS) IS SERIOUSLY PUNISHED BY CRIMINAL CODES.
  NEVER COPY.

THIS MACHINE HAS FUNCTION OF DETERMINING ILLEGAL IMITATION.
PLEASE CONFIRM FOREGOING, AND START OPERATION. ▶ CON-FIRM

↓ "CONFIRM" key is touched.
(3) ↓

FULL COLOR

SET COPY MODE through screen — 1

FINISH OF COPY | TYPE OF ORIGINAL
- FULL-COLOR | STANDARD
- MONO-COLOR | PHOTOGRAPH
- MONOCHROME | (PHOTO PAPER)

↓ Type (standard) of
(4) original is selected.

(4)

FULL-COLOR STANDARD | PAPER

SELECT SHEET CASSETTE — 1

| A3 | A4 | MANUAL FEED |
| B4 | B5 | AUTO POSTCARDS |

↓ Sheet size (A4T) is
(5) ↓ selected.

FULL-COLOR STANDARD | A4 | SCALE

SET SCALE TOUCH "CONFIRM" — 1

×1.000  ▼ ▲    ×1

UP | ×1.154 B4▶A3 B5▶A4 | ×1.224 A4▶B4 | ×1.414 A4▶A3 B5▶B4 | ×2.0 | ×4.0
DOWN | ×0.866 A3▶B4 A4▶B5 | ×0.816 B4▶A4 | ×0.707 A3▶A4 B4▶B5 | SLIGHTLY SMALL | CON-FIRM

↓ Scale (X1.000) is set and
(6) ↓ "CONFIRM" key is touched.

FULL-COLOR STANDARD | A4 | SCALE x1

OK — 1
IF SETTING AND NUMBER ARE CORRECT, PLEASE TOUCH "COPY" BUTTON AT RIGHT

DENSITY

LIGHT    STANDARD    DARK

Fig. 7

(1) FULL-COLOR PHOTGRAPH

SET COPY MODE through screen 1
FINISH OF COPY
- FULL-COLOR : COPY IN FULL-COLOR
- MONO-COLOR : COPY IN ONE OF RED, BLUE, GREEN···
- MONOCHROME : FOR MONOCHROME ORIGINAL (NOTE, TEXT,···)

(2) ↓ Full-color is selected. (Full-color key is touched.)

NO COPY OF BILLS

COPYING (IMITATION) OF BILLS (PAPER MONEYS) IS SERIOUSLY PUNISHED BY CRIMINAL CODES.
NEVER COPY.
THIS MACHINE HAS FUNCTION OF DETERMINING ILLEGAL IMITATION.
PLEASE CONFIRM FOREGOING, AND START OPERATION. ▶ CONFIRM (3) ↓ "CONFIRM" key is touched.

FULL COLOR
SET COPY MODE through screen 1
FINISH OF COPY | TYPE OF ORIGINAL
- FULL-COLOR | STANDARD
- MONO-COLOR | PHOTOGRAPH
- MONOCHROME | (PHOTO PAPER)

(4) ↓ Type (PHOTO) of original is selected.

COLOR PHOTO | SIZE OF PHOTO
SET SIZE OF PHOTO SIZE WITH TEN KEYS 1
X _ _ _ mm
Y _ _ _ mm
E-SIZE | L-SIZE | CONFIRM (5) ↓ Photograph size is set, and "CONFIRMATION" key is touched.
(X:127mm, Y:89mm(L-SIZE))

(5)

COLOR PHOTO | X 127mm Y 89mm | PAPER
SELECT SHEET CASSETTE 1

| A3 | A4 | MANUAL FEED |
| B4 | B5 | AUTO POSTCARDS |

(6) ↓ Sheet size (A4T) is selected.

COLOR PHOTO | X 127mm Y 89mm | A4 | FINISH
SET FINISH OF DUPLICATE through screen 1

| FULL SHEET | EQUAL/VARIABLE SCALE CENTERING |
| EXTRA COPY (x1) | EQUAL/VARIABLE SCALE |

(7) ↓ Finish of copy (full sheet) is set.

COLOR PHOTO | X 127mm Y 89mm | A4 | FULL SHEET
SET LAYOUT OF PHOTO through screen 1

| FULL IMAGE | EQUAL MARGIN |

(8) ↓ Layout (full image) is set.

COLOR PHOTO | X 127mm Y 89mm | A4 | FULL IMAGE
OK 1
IF SETTING AND NUMBER ARE CORRECT, PLEASE TOUCH "COPY" BUTTON AT RIGHT

Fig. 8

(1) MONO-COLOR

SET COPY MODE through screen — 1

FINISH OF COPY
- FULL-COLOR — COPY IN FULL-COLOR
- MONO-COLOR — COPY IN ONE OF RED, BLUE, GREEN···
- MONOCHROME — FOR MONOCHROME ORIGINAL (NOTE, TEXT,···)

(2) ↓ Mono-color is selected.

MONO-COLOR

MONO-COLOR SELECT SINGLE COLOR through screen — 1

- ORANGE
- YELLOW
- YELLOW GREEN
- RED
- GREEN
- VIOLET
- PURPLE
- BLUE (3) ↓ Single color (red) is selected.

RED | PAPER

SELECT SHEET CASSETTE — 1

- A3
- A4
- MANUAL FEED
- B4
- B5
- AUTO POSTCARDS

↓ Sheet size (A4T) is (4) selected.

(4)

RED | A4 | SCALE

SET SCALE TOUCH "CONFIRM" — 1

×1.000   SCALE×1

UP
- ×1.154 B4▶A3 B5▶A4
- ×1.224 A4▶B4
- ×1.414 A4▶A3 B5▶B4
- ×2.0
- ×4.0

DOWN
- ×0.866 A3▶B4 A4▶B5
- ×0.816 B4▶A4
- ×0.707 A3▶A4 B4▶B5
- SLIGHTLY SMALL
- CON-FIRM (5) ↓ Scale (X1.000) is set and "CONFIRM" key is touched.

RED | A4 | SCALE x1

OK — 1
IF SETTING AND NUMBER ARE CORRECT, PLEASE TOUCH "COPY" BUTTON AT RIGHT

DENSITY
LIGHT — AUTO — DARK

Fig. 9
MONOCHROME COPY
(1)
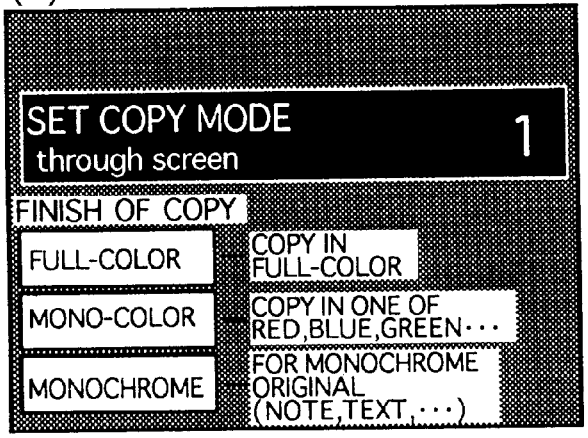
↓ Monochrome copy is
(2) ↓ selected.
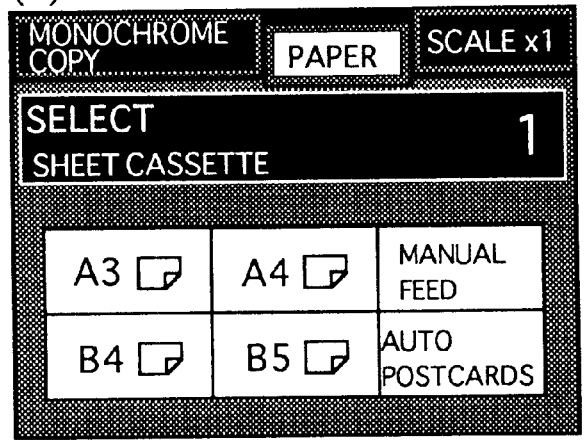
↓ Sheet size (A4T) is
(3) ↓ selected.  /KX
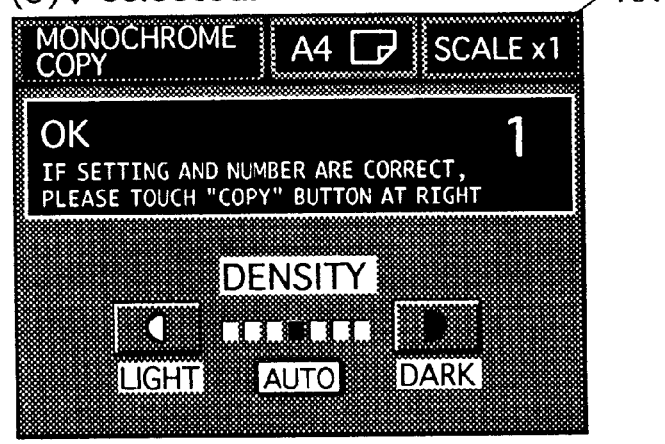

Fig. 11

BEING COPIED
IN FULL-COLOR MODE

Fig. 12

BILL IS FOUND IN
ORIGINAL BEING COPYING.

THIS COPYING MAY BE
ILLEGAL.

PLEASE CONFIRM.

IMAGE FORMING APPARATUS INCLUDING MEANS FOR WARNING AN OPERATOR OF A POTENTIAL ILLEGAL COPYING OPERATION BEFORE THE COPYING OPERATION AND METHOD OF CONTROLLING THE SAME

This application is based on patent applications Nos. 9-22532 Pat. and 9-184106 Pat. filed in Japan, the contents of which are hereby incorporated by reference.

BACKGROUND OF THE INVENTION

1. Field of the Invention

The present invention relates to an image forming apparatus and a method of controlling the same.

2. Description of the Related Art

Copying machines which are typical examples of image forming apparatuses are now widely used.

They are now used at various companies and offices, and are widely available to many peoples, for example at convenience stores, book stores, copy service stations and others.

Among copying machines which are now widely available, there are color copying machines provided with a function of forming color duplicate images.

With growing use of the color copying machines, various kinds of original images can now be color-copied without any difficulty. Under these circumstances, such a problem has arisen that bills, securities, postcards, postage stamps, copyrighted materials and others can be erroneously copied. In particular, it is generally less recognized that copyrighted materials cannot be color-copied. As an example of measures for prohibiting duplication of copy-protected materials, such a technique has been known that the copying machine has a bill determining function of automatically determining whether an original is a bill or not, and can disable a copying operation if the original is a bill. However, it is difficult to determine various kinds of copy-protected materials only by this kind of technique, and color-copying of a copy-protected original may be erroneously performed. In view of this, it is desired to request an operator to ascertain the original, to ascertain copied documents by a manager of the copying machine or the like, or to request an operator not to duplicate a color-copy-protected original.

With increase in number of generally available color copying machines having a function of forming a full-color duplicate image, users which are not used to operate the color copying machines are now increasing in number. Compared with general monochrome copying machines, the color copying machines have more functions such as color balance control which require more experience for setting and controlling them. Setting operations for these functions take a long time, and thus the color copying operation may take an excessively long time. Particularly, if the operator is not used to the operation of the color copying machine, the operation takes an extremely long time, and further many erroneously copied documents may be produced due to an erroneous operation. In the worst case, an operator cannot produce an intended duplicate even after repeating the copying operation many times. In this case, the operator needs a help by an expert such as a manager of the copying machine who is an expert in copying operation so that the operator can perform the color copying in a short time without producing many erroneous duplicates owing to an advice and an instruction by the expert.

SUMMARY OF THE INVENTION

Accordingly, it is an object of the invention to provide an image forming apparatus with a function of forming a full-color duplicate image, and particularly an image forming apparatus which can warn an operator of predetermined matters relating to copy-protection and others when the operator starts a copying operation in a full-color image forming mode, and disables the copying operation unless the operator confirms these matters.

It is also an object of the invention to provide an image forming apparatus with a function of forming a fullcolor duplicate image, and particularly an image forming apparatus which can operate when an operator starts the operation in a full-color image forming mode, and thereby notifies a third party such as a manager of the copying machine of this fact for helping the operator, finding copy-protected materials and other purposes.

According to one aspect of the invention, there is provided an image forming apparatus which includes:

color image reproducing means for reproducing an original image in multiple colors;

operating means for performing predetermined input relating to the reproduction of the color image;

first control means for displaying a predetermined warning in response to an operation of said operating means and disabling input through the operating means after the display of the warning;

confirmation input means for inputting confirmation of the display of the warning by an operator; and second control means for enabling subsequent input through said operating means in response to input through said confirmation input means, and there is also provided a method of controlling an image forming apparatus reproducing an original image in multiple colors and allowing a predetermined input operation relating to the reproduction of the color image, comprising the steps of:

displaying a predetermined warning in response to an input by said operation, and disabling the input by the operation after the display of the warning; and enabling the input by the operation after the display of the warning in response to input of confirmation representing confirmation of the displayed warning by an operator.

According to another aspect of the invention, there is provided an image forming apparatus which includes:

color image reproducing means for reproducing an original image in multiple colors;

operating means for performing predetermined input relating to the reproduction of the color image;

first control means for displaying a predetermined warning in response to an operation of said operating means and disabling image reproducing operation;

confirmation input means for inputting confirmation of the display of the warning by an operator; and second control means for enabling the image reproducing operation in response to input through said confirmation input means, and there is also provided a method of controlling an image forming apparatus reproducing an original image in multiple colors and allowing a predetermined input operation relating to the reproduction of the color image, comprising the steps of:

displaying a predetermined warning and disabling the image reproducing operation in response to an input by said operation; and enabling the image reproducing operation in response to input of confirmation representing confirmation of the displayed warning by an operator.

According to another aspect of the invention, there is provided an image forming apparatus which comprises:

select means for selecting a color image forming mode for forming an image in multiple colors;

color image reproducing means for reproducing an original image in multiple colors when said color image forming mode is selected; and notifying means for notifying a third party other than an operator of the fact that the operator is performing a color image forming operation in response to selection of the color image forming mode by said select means or the image reproducing operation by said color image reproducing means, and there is also provided a method of controlling an image forming apparatus allowing selection of a color image forming mode for forming an image in multiple colors, and being capable of reproducing the original image in multiple colors when said color image forming mode is selected, comprising the step of notifying a third party other than an operator of the fact that the operator is performing the color image forming operation in response to selection of said color image forming mode or said color image reproducing operation.

According to still another aspect of the invention, there is provided an image forming apparatus which comprises:

select means for selecting a monochrome image forming mode for printing an image in a single black color and a color image forming mode for printing an image in multiple colors;

monochrome image forming means for printing an image corresponding to an original image in a single black color when said monochrome image forming mode is selected;

color image forming means for printing an image corresponding to an original image in multiple colors when said color image forming mode is selected;

notifying means for notifying a third party other than an operator of the fact that the operator is performing a color printing operation; and notification control means for performing the notification by said notifying means in response to the selection of the color image forming mode by said select means or the printing operation by said color image forming means, and disabling the notification by said notifying means when said monochrome image forming mode is selected.

According to yet another aspect of the invention, there is provided an image forming apparatus being connectable to an external control apparatus via a communication line and comprising:

color image reproducing means for reproducing an original image in multiple colors;

copy-protected original determining means for determining whether an original is a copy-protected material or not;

transmission means for sending control information of said image forming apparatus to said external control apparatus; and transmission control means for sending at predetermined timing from said transmission means a signal representing the fact that the original is copy-protected when said copy-protected original determining means determines that the original is a copy-protected original.

In any of the above apparatuses and methods, the above display of the warning may be performed, for example, by displaying a message to the effect that copying of bills is prohibited, copying of securities is prohibited, unauthorized copying of copyrighted materials is prohibited.

The means and manners for notification to the third party other than the operator may employ a device such as a buzzer, a sound generator generating, e.g., a melody sound, a light (e.g., an on/off light or a light of a specific color) or a display which is arranged at the image forming apparatus, or may employ a device such as a buzzer, a sound generator generating, e.g., a melody sound, a light (e.g., an on/off light or a light of a specific color) or a display (e.g., a unit panel of LED or LCD, or a CRT) which is connected to the image forming apparatus via wire or wireless communication. Also, a computer which is provided with a display and is connected to the apparatus may be employed for the above purpose.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows a transition of pictures on the console panel display in a standard full-color image forming mode;

FIG. 7 shows a transition of pictures on the console panel display in a photograph full-color image forming mode;

FIG. 8 shows a transition of pictures on the console panel display in a mono-color image forming mode;

FIG. 9 shows a transition of pictures on the console panel display in a monochrome image forming mode;

FIG. 11 shows an example of a picture on a CRT display during full-color image copying; and FIG. 12 shows an example of a picture on the CRT display when a bill is recognized.

DESCRIPTION OF THE PREFERRED EMBODIMENTS OF THE INVENTION

A color copying machine which is an example of an image forming apparatus according to the invention and a method of controlling the same will now be described below with reference to the drawings.

Figure 1:
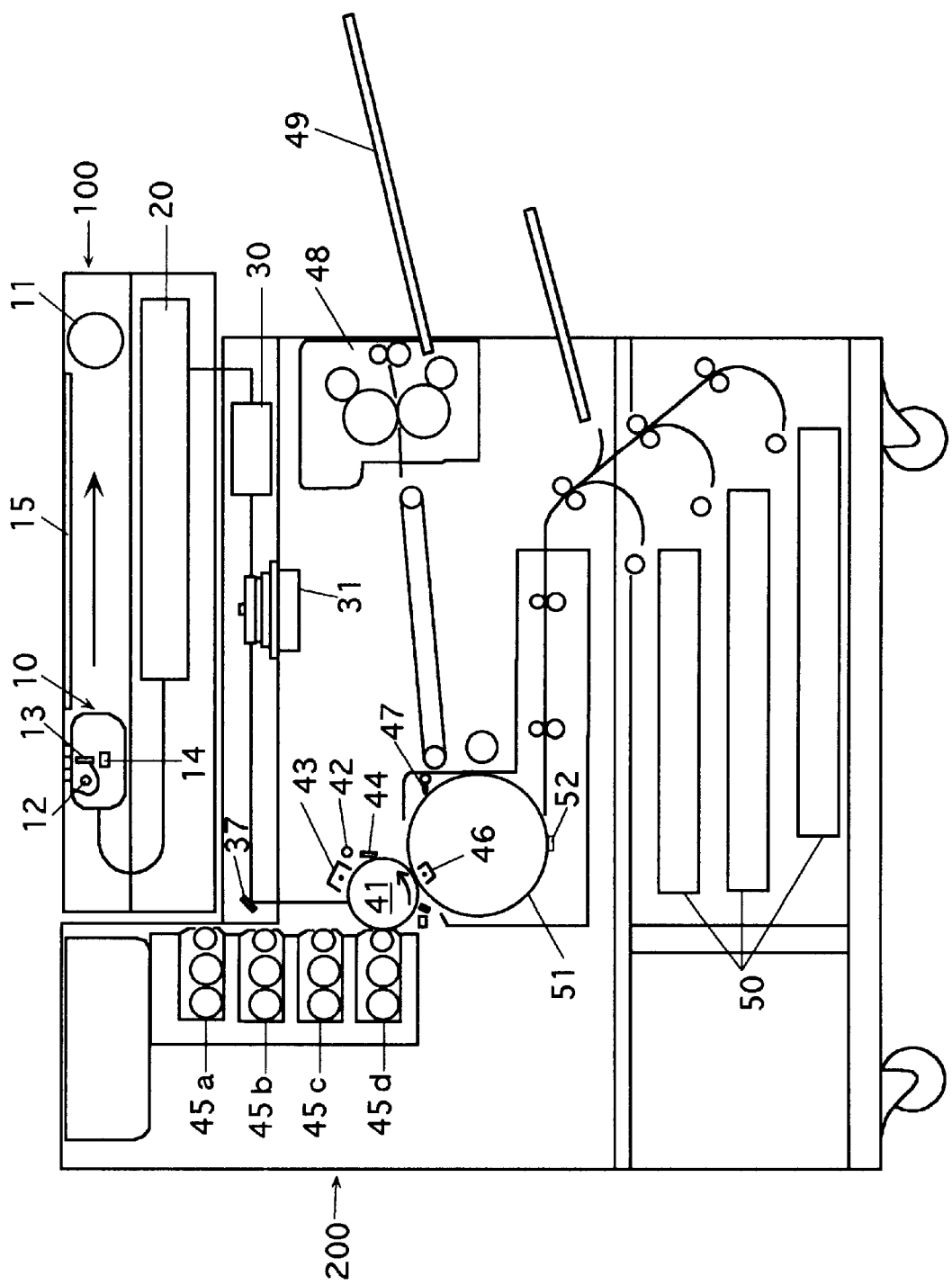
FIG. 1 shows a schematic structure of a digital color copying machine according to the invention.

FIG. 1 shows a whole structure of an example of a digital color copying machine. This digital color copying machine basically includes an image reading part 100 for reading an original image and a printing part 200 for reproducing an image from image data read by the image reading part 100.

In the image reading part 100, a scanner 10 includes an exposure lamp 12 for illuminating an original document, a rod lens array 13 for converging light beams reflected by the original document, and a CCD color image sensor 14 of a close-contact type for converting the converged light beams into electric signals. The scanner 10 is driven by a scan motor 11 during an operation for reading an original image, and thereby moves in a secondary scanning direction (subscanning direction) indicated by an arrow to scan the original document laid on an original table 15. The image sensor 14 converts the reflected light beams coming from the original surface into multivalued electric signals of three colors, i.e., R, G and B colors. The multivalued electric signals of three colors, i.e., R, G and B colors are converted into 8-bit gradation data by an image signal processing portion 20, and then are stored in a buffer memory 30 for synchronization.

In the printing part 200, a print head portion 31 effects D/A (digital/analog) conversion on the received gradation data to produce a laser diode drive signal, and drives a semiconductor laser in accordance with this drive signal. A laser beam emitted from the semiconductor laser exposes a photosensitive drum 41, which is driven to rotate, through a reflector mirror 37. The photosensitive drum 41 is irradiated with light beams emitted from an eraser lamp 42 before the exposure in each of the operations of forming toner images of cyan (C), magenta (M), yellow (Y) and black (BK), and is uniformly charged by an electric charger 43. When exposed after the charging, an electrostatic latent image of the original is formed on the photosensitive drum 41. Only one of toner developing devices 45a–45d of cyan (C), magenta (M), yellow (Y) and black (BK) is selected, and the electrostatic latent image on the photosensitive drum 41 is developed. Paper sheets are supplied from one of three sheet cassettes 50 depending on intended sizes. A catching mechanism 52 on a transfer drum 51 catches a leading edge of the fed sheet, and holds the sheet on the drum 51 to prevent shifting of its position during the image transfer operation. The developed toner image is transferred by a transfer charger 46 onto the sheet wound around a transfer drum 51.

In the full-color image forming mode, the above process is successively repeated for the four colors, i.e., cyan (C), magenta (M), yellow (Y) and block (BK). In these operations, the scanner 10 repeats the scanning operation in synchronization with the operations of the photosensitive drum 41 and the transfer drum 51. Thereafter, the sheet is separated from the transfer drum 51 by an operation of a separator claw 47, and the toner image is fixed when passing through a fixing device 48. Then, the sheet is discharged onto a discharge tray 49.

In this color copying machine, monochrome copying can be performed with the toner developing device 45d of black (BK), and single-color or mono-color copying can also be performed with the toner developing device of a desired single color.

Figure 2:
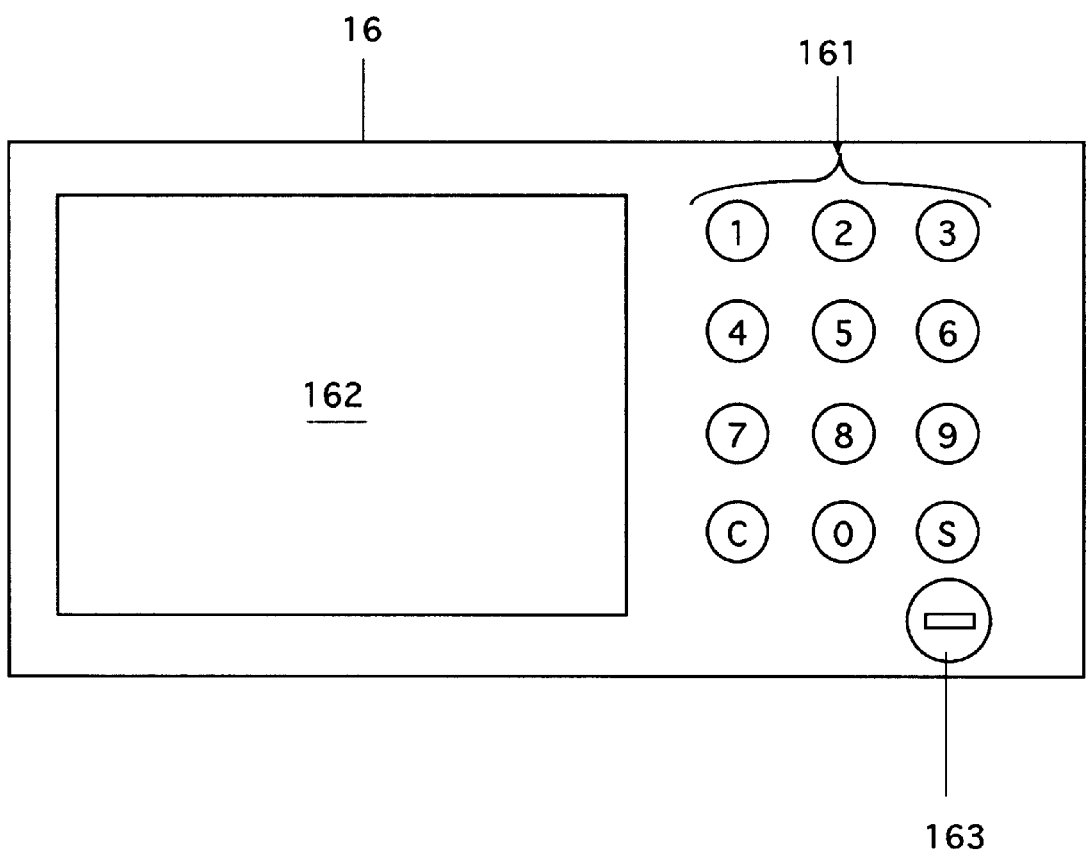
FIG. 2 is a plan showing a console panel of the copying machine shown in FIG. 1.

FIG. 2 is a plan of a console panel 16 of the copying machine. The number of sheets to be copied can be set through a ten key set 161. A display unit 162 displays the copy mode, the number of sheets to be copied and others which are set by a user (i.e., an operator of the copying machine). A print key ("copy" button) 163 is used for instructing start of the copying.

The display unit 162 is a touch-sensitive liquid crystal display. Setting and entry of the copy mode and others can be performed by touching the various setting and select buttons displayed on the display panel or by entering the intended number through the ten key set 161.

Figure 3:
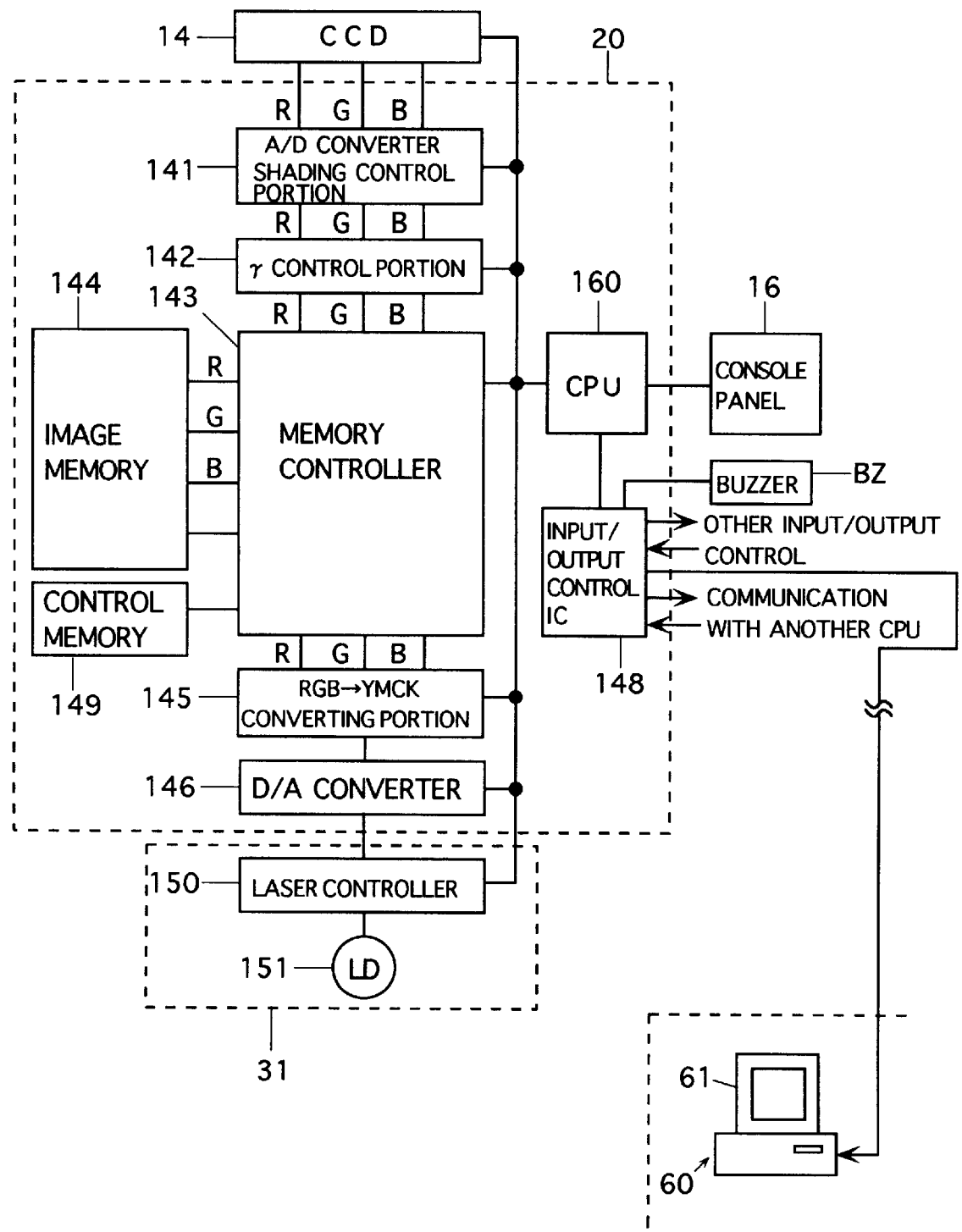
FIG. 3 is a block diagram of an electric circuitry in the copying machine shown in FIG. 1.

FIG. 3 is a block diagram of an electric circuitry of the image signal processing portion 20 and others of the digital color copying machine. RGB image data of the original read by the CCD color image sensor 14 is subjected to the A/D conversion and shading control at the preprocessing portion 141 in the image signal processing portion 20, and then is subjected to predetermined gradation correction at a gamma correction portion 142. The data after the gradation correction is temporarily stored in an image memory 144 through a memory controller 143. Two-dimensional address on x-and y-coordinates (i.e., coordinates in the primary and secondary scanning directions)with respect to the original are set in the image memory 144, and attribute data of 8 bits for each pixel are stored together with the RGB image data in the memory 144.

The image data is read to a color converting portion 145 in accordance with operation timing of the image forming portion for each color. The color converting portion 145 converts the RGB image data read from the image memory 144 into 8-bit gradation data of one of cyan (C), magenta (M), yellow (Y) and block (BK), and outputs the converted data. The data subjected to the color conversion is converted into an analog signal by a D/A converter 146. A laser controller 150 in the print head portion 31 issues a laser drive signal based on the analog signal sent from the D/A converter 146, and thereby drives a semiconductor laser device 151.

Information relating to various copying conditions which are set by the operator through the console panel 16 is stored in a control memory 149. A central processing unit 160 (CPU 160) reads the information stored in the control memory 149, and performs sequence control of the image signal processing portion 20 and the print head portion 31 based on the read data. An IC 148 for input/output control can operate to enable other input/output control during the actual copying operation as well as communication with another central processing unit (CPU, not shown) such as a central processing unit in an external control apparatus connected via a communication line. The console panel 160 is connected to this CPU 160. The IC 148 for input/output control in this embodiment is connected to a buzzer BZ and a PC (Personal Computer) 60. The buzzer BZ sounds one reception sound when the key (the ten key, print key or another key displayed on the touch-sensitive panel) on the console panel 16 is operated except for a special case which will be described later.

The PC 60 is provided with a CRT display 61, which is placed outside or remote from the copying machine, receives signals from the copying machine in a special case which will be described later, and thereby displays predetermined messages which will also be described later.

The CPU 160 also controls the operations of the whole copying machine.

In the digital full color copying machine described above, it is possible to select an image forming mode for full-color copying, mono-color copying (copying in one color other than black) or monochrome copying (copying in black). The machine also has various creation functions. These modes are selected depending on intended copy output results and purposes. Accordingly, matters and notes must be alerted and notified to the operator depending on the selected mode. Some matters must be notified to the user in a certain mode(s), but is not necessary in other mode(s). In this copying machine, matters to be notified in the selected mode are displayed at least one time for notification on the console panel or the like, and the next operation stage can be started only after a certain action (confirmation action in this embodiment) is performed on the copying machine in response to the display. Also, display or the like of matters not requiring notification is not performed, and thereby increase in number of operation steps is prevented. Thus, unnecessary information is not notified, but necessary information can be notified to the operator and/or others without a fail.

Generally, the buzzer sounds once in response to one key operation on the console panel or the like. However, in such a situation that the copying machine displays a matter to be confirmed by the user and the user performs the operation for confirmation, the buzzer sounds several times so that this situation can be notified to the third party (e.g.,the manager of the copying machine).

Usually, the CRT 61 does not display any matter. However, when the copying machine enters the full-color image forming mode, the CRT 61 displays this situation so that the third party can be notified of the situation.

This will be described in more detail below.

Naturally, the mono-color copying and monochrome copying reproduce images in colors different from those of original images, and therefore duplicates of bills, securities or the like prepared by such kinds of copying can be easily distinguished from the originals. However, copying in the full-color image forming mode can faithfully reproduce original colors so that duplicates of bills, securities or the like prepared in this mode may not be distinguished from the original at first glance. Naturally, this copying is illegal. In the case of the copying in the full-color image forming mode, therefore, the user is notified of the above matter for confirmation. This notification is performed by displaying a message or the like on the display 162 of the console panel 16.

Two- or three-color copying may produce duplicates in the same colors as the protected original, and therefore a display for conformation may likewise be performed in this case.

Transitions of pictures or contents displayed on the display 162 in the full-color, mono-color and monochrome copying operations will be described below with reference to FIG. 5.

Figure 5:
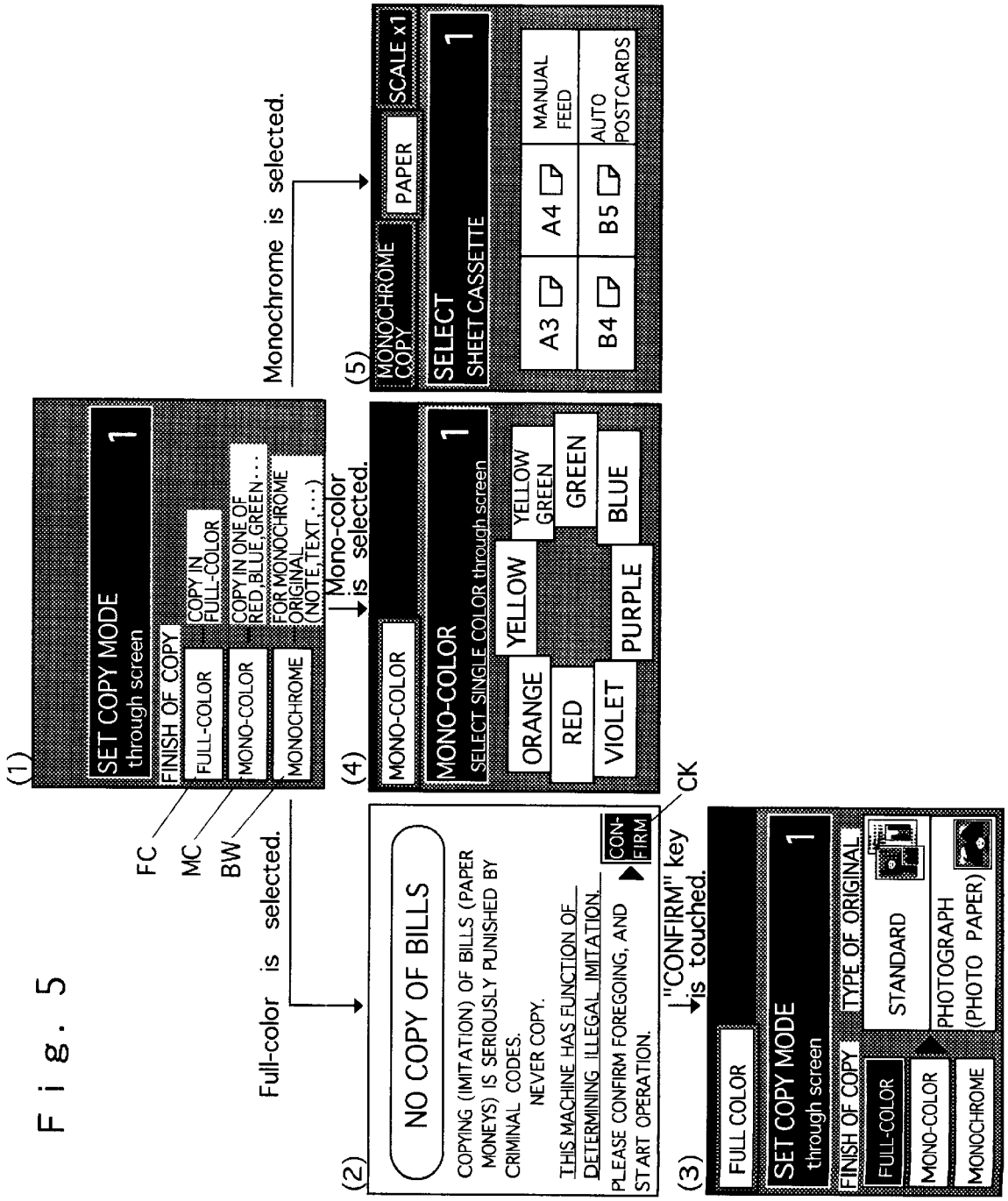
FIG. 5 shows various transitions of pictures on a console panel display for full-color, mono-color and monochrome copying, respectively.

When the color copying machine is powered on, picture (1) shown in FIG. 5 is displayed on the screen of the display 162.

The displayed picture contains a key FC for selecting full-color copying (full-color image forming mode), a mono-color key MC for selecting mono-color copying (mono-color image forming mode) and a key BW for selecting a monochrome copying (monochrome image forming mode).

When the key FC is touched, the full-color image forming mode is selected, and the machine displays a warning of a picture (2) in FIG. 5 and attains the copy disabled state. The picture (2) can clearly notify the user that copying of bills or the like is illegal and prohibited by displaying, for example, "NO COPYING OF BILLS". The picture (2) also contains a confirmation key CK for confirmation of the above warning by the user. When the user operates the confirmation key CK to select finally the full-color image forming mode, the buzzer BZ sounds predetermined times to notify the third party of selection of the full-color image forming mode. In response to operation of the confirmation key CK, a picture (3) for the next operation in the color image forming mode is displayed. If the confirmation key CK is not touched, the picture (3) is not displayed, and the copying is not enabled.

As described above, the buzzer BZ sounds predetermined times in response to operation of the confirmation key. Thereby, the manager can start monitoring for finding an illegal act such as copying of bills, and also can help the user, if necessary, in copying operation in the full-color image forming mode which is more complicated than the operations for the mono-color copying and monochrome copying.

When the key MC in the picture (1) is operated, the mono-color image forming mode is selected, and a picture (4) for the next operation in this mode is immediately displayed. When the key BW in the picture (1) is operated, the monochrome image forming mode is selected, and a picture (5) for the next operation in this mode is immediately displayed.

By employing the operation steps and variable pictures, the picture (2) is not displayed if it is not necessary, and the picture (2) is displayed to notify the user of the contents therein if necessary.

When the operation starts for forming the full-color duplicate images after the copying mode is set through the picture (3), this situation is notified to the third party. This notification is performed by displaying a massage on the display 61 of the computer(PC) 60 which is placed outside the copying machine.

Figure 4:
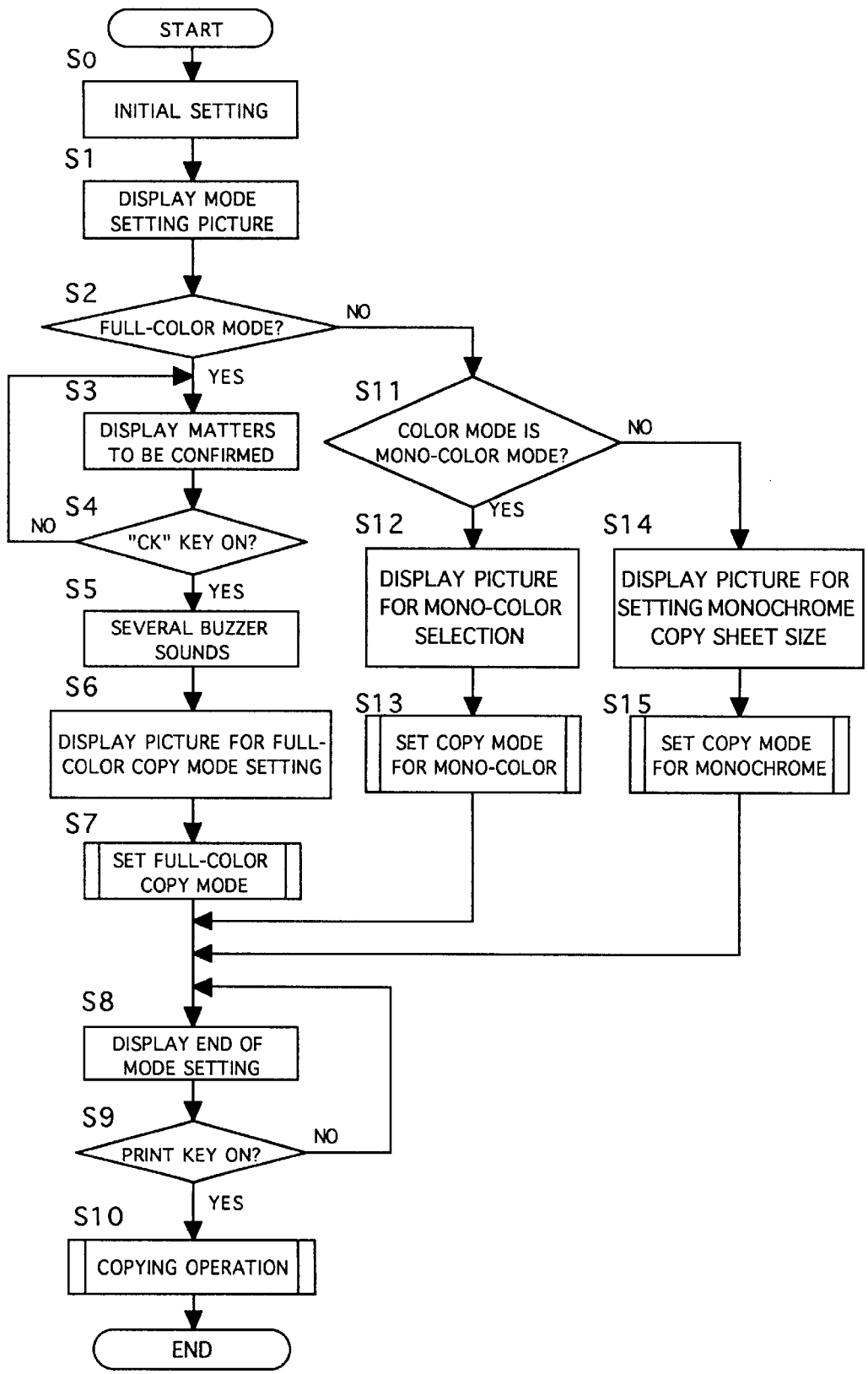
FIG. 4 is a flow chart showing an operation of a CPU 160 in the electric circuitry shown in FIG. 3.
Figure 10:
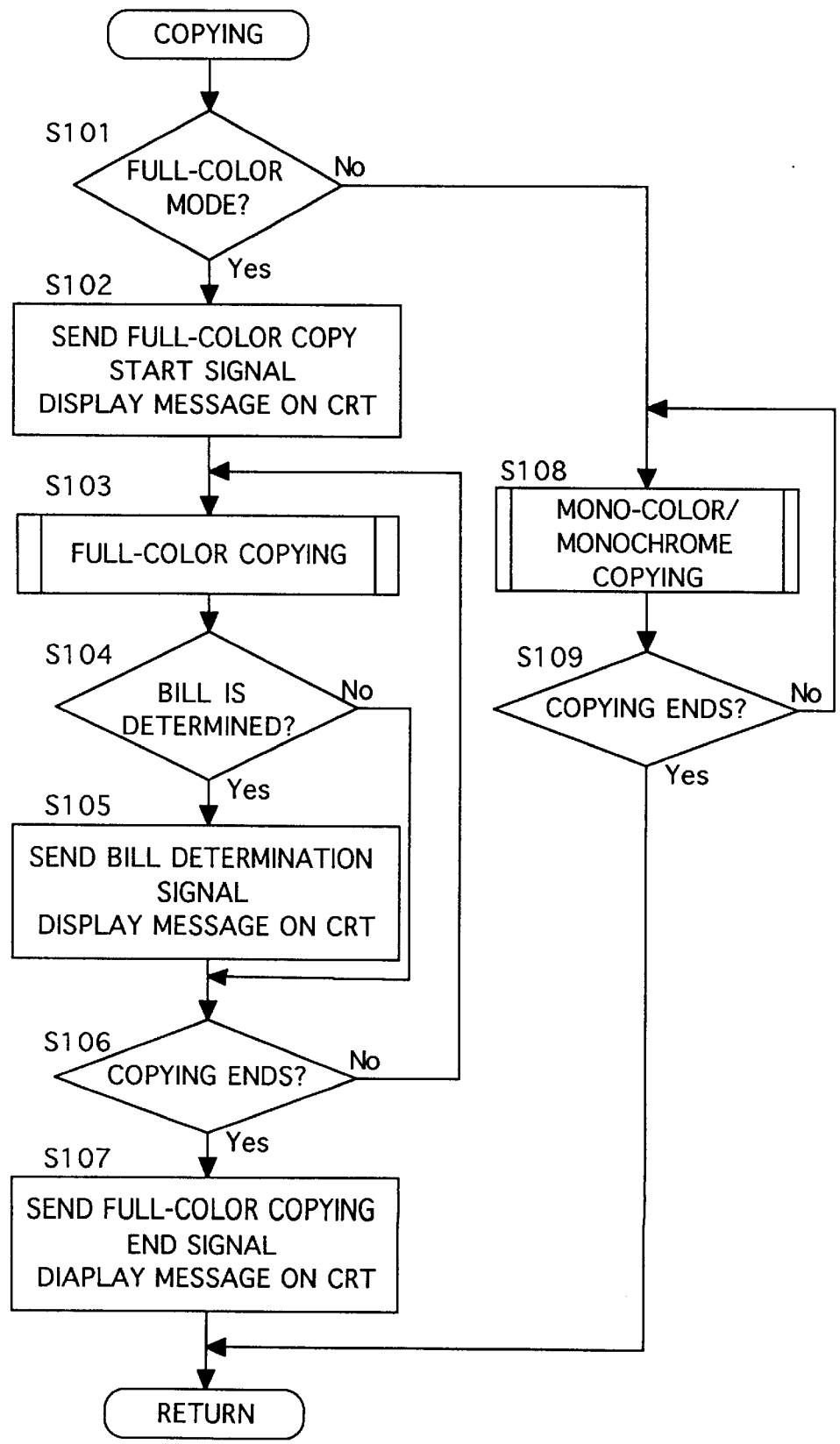
FIG. 10 is a flow chart showing a copying operation in step S10 in the flow chart shown in FIG. 4.

Description will now be given on operation steps in various image forming modes with reference to FIG. 4 and FIGS. 6 to 12. FIG. 4 is a flow chart showing the operation of the CPU 160 in the electric circuitry shown in FIG. 3. FIGS. 6 to 9 show examples of transitions of pictures on the operation panel display 162 in the various image forming modes. FIG. 10 is a flow chart showing copying operations in a step 10 on the flow chart shown in FIG. 4. FIGS. 11 and 12 show examples of pictures displayed on the CRT display 61 shown in FIG. 3.

As shown in the flow chart in FIG. 4, the CPU 160 performs initial setting upon start of the program, and the image forming mode select picture (1) in FIG. 5 (which is the same as the pictures (1) in FIGS. 6 to 9) is displayed (steps SO and SI). When the user selects the full-color image forming mode, the picture (2) in FIG. 5 (which is the same as pictures (2) in FIGS. 6 and 7) is displayed, and next operation is not allowed until the user touches the confirmation key CK in the displayed picture (2) (steps S2, S3 and S4).

As described above, the next operation cannot start unless the user touches the confirmation key CK. Therefore, the machine can reliably request the user to confirm the fact that the original is not a copy-protected, and careless copying of copy-protected originals can be prevented.

In this embodiment, the warning is displayed upon selection of the full-color image forming mode. Alternatively, the machine may be adapted to perform warning in response to the operation of the print key after the selection of the full-color image forming mode, and start the next step after the user touches the confirmation key CK in response to the warning.

When the user touches the confirmation key CK in the picture (2) shown in FIG. 5, the buzzer BZ sounds predetermined times, and thereby notifies the third party of the selection of the full-color image forming mode. Also, a picture (3) in FIG. 5, which is the same as the pictures (3) in FIGS. 6 and 7, is displayed (steps S5 and S6). Since the buzzer BZ sounds predetermined times, the manager, i.e., third party can recognize that the full-color image forming mode is selected so that the manager can monitor the operation to find illegal copying of bills and others. Also, the manager can help, if necessary, the operator in operation of the full-color copying.

In next step S7, specific copy modes or conditions in the full-color image forming mode are set in the following manner.

Through the picture (3) shown in FIG. 5, the user selects a standard mode for copying a general colored original without specifying a type of the original, or a photograph mode prepared for copying a photograph. In the photograph mode, the image signal processing portion 20 performs image processing suitable to the photograph so that a copied image having a good quality can be produced based on sizes of the original and the duplicate.

When the standard mode is selected, a size of the copy sheet is selected through a next picture (4) in FIG. 6, and a copy magnification or scale is set through a next picture (5) in FIG. 6.

When the photograph mode is selected through the picture (3) in FIG. 5, the size of the original (i.e., photograph) is selected through the next picture (4) in FIG. 7, and the size of the copy sheet is selected in the next picture (5) in FIG. 7. Subsequently, the intended quality or finished state of the copied image is set through a next picture (6) in FIG. 7, and positioning or layout of the photograph is set through a next picture (7) in FIG. 7.

When setting of the copy modes or conditions in the full color image forming mode are completed, completion of the mode setting is displayed by a picture (6) in FIG. 6 or a picture (8) in FIG. 7 (step 8), and the actual copying operation (i.e., duplicate image forming operation) starts upon operation of the print key ("copy" button) 163 (steps S9 and S10).

When the user selects the mono-color image forming mode through the image forming mode selecting picture (1) in FIG. 5, a picture (4) in FIG. 5, which is the same as the picture (2) in FIG. 8, is displayed (steps S2, S11 and S12).

In the next step S13, copy modes or conditions in the mono-color image forming mode are set or selected as follows:

A specific color is selected through the picture (4) in FIG. 5 which is the same as the picture (2) in FIG. 8.

A copy sheet size is selected through the next picture (3) in FIG. 8.

A copy magnification or scale is set through the next picture (4) in FIG. 8.

When setting of the copy modes or conditions in the mono-color image forming mode is completed, completion of the mode setting is displayed by the picture (5) in FIG. 8 (step S8), and the actual copying operation starts upon operation of the print key ("copy" button) 163 (steps S9 and S10).

When the user selects the monochrome image forming mode through the image forming mode selecting picture (1) in FIG. 5, the picture (5) in FIG. 5, which is the same as the picture (2) in FIG. 9, is displayed (steps S2, S11 and S14).

In a next step S15, copy modes or conditions in the monochrome image forming mode are set or selected. More specifically, the user selects a copy sheet size through the picture (5) in FIG. 5, which is the same as the picture (2) in FIG. 9.

When setting of the copy modes or conditions in the monochrome image forming mode are completed, completion of the mode setting is displayed by the picture (3) in FIG. 9 (step 8), and the actual copying operation starts upon operation of the print key ("copy" button) 163 (steps S9 and S10). In the monochrome image forming mode, the copy magnification or scale is initially and automatically set to ×1, but can be manually changed, if desired, through the magnification setting picture, which can be displayed by touching a key KX in the picture (3) shown in FIG. 9 and is similar to the picture (5) in FIG. 6. The key KX and other keys are displayed at an upper portion in the picture during setting together with the set contents. By operating these keys, the former picture corresponding to the operated key is displayed again so that the set contents can be changed or cancelled.

As described above, when the full-color image forming mode is selected, the warning is always displayed by the picture (2) in FIG. 5, and the next operation cannot be started unless confirmed by the user. However, display of the warning is eliminated in the other image forming modes, and unnecessary information is not notified.

In the mono-color mode and monochrome mode, therefore, the copying operation is enabled without requiring input of confirmation by the user.

Then, the actual copying operation (duplicate image forming operation) in the step S10 in FIG. 4 will be now described below with reference to FIG. 10.

In the copying process, as shown in the flow chart in FIG. 10, it is first determined whether the selected mode is the full-color image forming mode or not (step S11). If it is the full-color image forming mode and, in other words, if the full-color duplicate image forming operation is to be performed, the input/output control IC 148 in FIG. 3 issues a full-color image copy start signal to the computer PC 60, and the CRT 61 displays a message "BEING COPIED IN FULL-COLOR MODE" as shown in FIG. 11 (step S102). Thereby, the third party (manager or the like) is notified of the fact that the copying operation is being performed in the full-color image forming mode. Then, the full-color copying operation starts (step S103). Then, it is determined whether the original is a bill or not (step S104). If it is determined that the original is a bill then, the input/output control IC 148 in FIG. 3 issues the bill recognition signal to the PC 60, and the CRT 61 displays a message "BILL IS FOUND IN ORIGINAL BEING COPIED. THIS COPYING MAY BE ILLEGAL. PLEASE CONFIRM." for notifying the possibility of illegal copying as shown in FIG. 12 (step S105). Thereby, the third party can monitor the copying operation to determine whether the user is going to perform prohibited copying or not. Determination and discrimination of the bill is performed, for example, by known means and manners that the machine stores sampled data of image read for copying, and compares it with distinctive patterns of bills already stored in the machine to determine whether the original is a bill or not. Since these means and manners are well known, they are not described in detail. When it is determined that the original is not a bill in step S104, the operation immediately enters a step S106. In the step S106, it is determined whether the full-color image copying operation is subsequently to be performed. If the next copying operation is to be performed subsequently, the operation returns to the step S103 to repeat the similar processing. If the copying operation is ended, the control IC 148 in FIG. 3 issues a full-color image copying end signal to the PC 60 in the step S107, and the CRT 61 displays a message "COPYING IN FULL-COLOR MODE IS ENDED" to notify the third party to this effect. Then, the operation returns to the main routine.

If it is determined that the selected mode is not the full-color image forming mode in step S101, then mono-color image copying or monochrome image copying is performed (step S108). If mono-color or monochrome image copying is subsequently to be performed, then the operation in step S108 is repeated. If the mono-color or monochrome image copying is ended, then the operation returns to the main routine shown in FIG. 4 (step S109).

As the means for notifying the third party of the fact that the operation is in the full-color image forming mode, the embodiment employs the buzzer BZ for notifying that the full-color image forming mode is selected, and also employs the PC (personal computer) 60 with the CRT (display) 61 for notifying that the full-color image copying is being is performed. However, the notifying means are not restricted to them, and alternatively the copying machine may employ a light (e.g., an on/off light or a light of a specific color), a display (e.g., a unit panel of LED or LCD, or a CRT) or a sound generator generating, e.g., a melody sound, which is arranged at the copying machine, or may employ a buzzer, a light (e.g., an on/off light or a light of a specific color), a display (e.g., a unit panel of LED or LCD, or a CRT), or a sound generator generating, e.g., a melody sound, which is arranged outside but is connected to the copying machine. In any case, two of these devices or manners may be employed in combination.

In the above embodiment, the CRT 61 displays the message in FIGS. 11 and 12 during the full-color duplicate image forming operation for notifying the third party to the effect. Alternatively, such a manner may be employed that the picture (2) in FIG. 5, which is the same as the pictures (2) in FIGS. 6 and 7, is displayed in accordance with selection of the full-color image forming mode, and the CRT 61 displays, for example, a message "FULL-COLOR MODE IS SELECTED" to notify the third party of this fact when the user touches the confirmation key CK in the picture (2).

As described above, when the operator starts the operation for copying in the full-color image forming mode, a predetermined warning relating to copy-protected materials and others is given to the operator, and the actual copying cannot be performed unless the operator confirms this warning.

When the operator starts the operation of copying in the full-color image forming mode, and/or during the copying operation, the third party such as a manager of the copying machine is notified of these facts for enabling help in the copying operation and finding the copying of copy-protected materials.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   color image reproducing means for reproducing an original image in multiple colors;
   operating means for performing a predetermined input relating to the reproduction of the color image;
   first control means for displaying a predetermined warning in response to an operation of said operating means for performing the predetermined input relating to the reproduction of the color image without regard to whether the original image is a specified image or not and disabling input through said operating means after the display of the warning;
   confirmation input means for inputting confirmation of the display of said warning by an operator; and
   second control means for enabling subsequent input through said operating means in response to input through said confirmation input means.

2. The image forming apparatus according to claim 1, wherein
   said operating means includes select means for selecting color image forming mode for forming the image in multiple colors, and said first control means displays said warning in response to selection of the color image forming mode by said select means, and disables the input through said operating means after the display of the warning.

3. The image forming apparatus according to claim 2, wherein
   the input operation disabled by said first control means after the display of the warning is the operation for instructing setting of the image forming operation mode.

4. The image forming apparatus according to claim 3, wherein
   said image forming operation mode is an operation mode for an original including a photograph.

5. The image forming apparatus according to claim 1, wherein
   the input operation disabled by said first control means after the display of the warning is the operation for instructing start of the image reproducing operation.

6. The image forming apparatus according to claim 1, wherein
   said first control means further has notifying means for notifying a third party of the fact that an operator performs an operation relating to reproduction of a color image in response to the operation of said operating means.

7. The image forming apparatus according to claim 6, wherein
   said notifying means sounds a warning sound for notification to the third party.

8. The image forming apparatus according to claim 6, wherein
   said notifying means performs warning display other than warning sound for notification to the third party.

9. The image forming apparatus according to claim 1, wherein
   said color image reproducing means is full-color image reproducing means.

10. The image forming apparatus according to claim 1, wherein
    said displayed warning is a display to the effect that copying of a bill is illegal.

11. An image forming apparatus comprising:
    color image reproducing means for reproducing an original image in multiple colors;
    operating means for performing a predetermined input relating to the reproduction of the color image;
    first control means for displaying a predetermined warning in response to an operation of said operating means for performing the predetermined input relating to the reproduction of the color image without regard to whether the original image is a specified image or not and disabling image reproducing operation;
    confirmation input means for inputting confirmation of the display of said warning by an operator; and
    second control means for enabling the image reproducing operation in response to input through said confirmation input means.

12. The image forming apparatus according to claim 11, wherein said operating means includes select means for selecting color image forming mode for forming the image in multiple colors, and said first control means displays said warning in response to selection of the color image forming mode by said select means, and disables the image reproducing operation.

13. The image forming apparatus according to claim 11, further comprising mono-color image reproducing means for reproducing the original image in a single color.

14. The image forming apparatus according to claim 11, wherein said first control means further has notifying means for notifying a third party of the fact that an operator performs an operation relating to reproduction of a color image in response to the operation of said operating means.

15. The image forming apparatus according to claim 14, wherein said notifying means sounds a warning sound for notification to the third party.

16. The image forming apparatus according to claim 14, wherein said notifying means performs warning display other than warning sound for notification to the third party.

17. The image forming apparatus according to claim 11, wherein said second control means further has notifying means for notifying a third party of the fact that the image reproducing operation is performed by said color image reproducing means.

18. The image forming apparatus according to claim 11, wherein said color image reproducing means is full-color image reproducing means.

19. The image forming apparatus according to claim 11, wherein said displayed warning is a display to the effect that copying of a bill is illegal.

20. An image forming apparatus comprising:

select means for selecting a color image forming mode for forming an image in multiple colors;

color image reproducing means for reproducing an original image in multiple colors when said color image forming mode is selected; and notifying means for notifying a third party other than an operator of the fact that the operator is performing a color image forming operation only in response to selection of the color image forming mode by said select means or the image reproducing operation by said color image reproducing means.

21. The image forming apparatus according to claim 20, wherein said notifying means sounds a warning sound for notification to the third party.

22. The image forming apparatus according to claim 20, wherein said notifying means performs display for notification to the third party.

23. The image forming apparatus according to claim 22, wherein said notifying means is accompanied by display means independent of said image forming apparatus, and sends to said display means a signal representing that the color image forming operation is being performed in response to selection of the color image forming mode by said select means or the image reproducing operation by said color image reproducing means.

24. The image forming apparatus according to claim 20, wherein a predetermined warning different from the notification by said notifying means is displayed for the operator in response to selection of the color image forming mode by said select means.

25. The image forming apparatus according to claim 24, further comprising:

confirmation input means for inputting confirmation of the display of said warning by the operator; and means for enabling the image reproducing operation of said color image reproducing means in response to input through said confirmation input means.

26. The image forming apparatus according to claim 20, further comprising:

copy-protected original determining means for determining whether the original is a copy-protected material; and second notifying means for notifying the third party other than the operator of the fact that the original is the copy-protected material when said copy-protected original determining means determines that the original is the copy-protected material.

27. The image forming apparatus according to claim 20, wherein said color image reproducing means is full-color image reproducing means.

28. An image forming apparatus comprising:

select means for selecting a monochrome image forming mode for printing an image in a single black color and a color image forming mode for printing an image in multiple colors;

monochrome image forming means for printing an image corresponding to an original image in a single black color when said monochrome image forming mode is selected;

color image forming means for printing an image corresponding to an original image in multiple colors when said color image forming mode is selected;

notifying means for notifying a third party other than an operator of the fact that the operator is performing a color printing operation; and notification control means for performing the notification by said notifying means only in response to the selection of the color image forming mode by said select means or the printing operation by said color image forming means, and disabling the notification by said notifying means when said monochrome image forming mode is selected.

29. The image forming apparatus being connectable to an external control apparatus via a communication line and comprising:

color image reproducing means for reproducing an original image in multiple colors;

copy-protected original determining means for determining whether the original color image is a copy-protected material or not;

transmission means for sending control information of said image forming apparatus to said external control apparatus; and transmission control means for sending at predetermined timing from said transmission means a signal representing the fact that the original is copy-protected when said copy-protected original determining means determines that the original is a copy-protected original.

30. The image forming apparatus according to claim 29, wherein said transmission control means further sends a signal representing the fact that the color image reproducing operation is being performed in response to the image reproducing operation by said color image reproducing means.

31. The image forming apparatus according to claim 29, further comprising:

operating means for performing predetermined input relating to said color image reproduction, wherein said transmission control means further sends a signal representing the fact that the color image reproducing operation is being performed in response to the operation of said operating means.

32. A method of controlling an image forming apparatus reproducing an original image in multiple colors and allowing a predetermined input operation relating to the reproduction of the color image, comprising:

displaying a predetermined warning in response to an input by said operation relating to the reproduction of the color image without regard to whether the original image is a specified image or not, and disabling the input by the operation after the display of the warning; and enabling the input by the operation after the display of the warning in response to a confirmation input representing confirmation of the displayed warning by an operator.

33. The method of controlling the image forming apparatus according to claim 32, wherein a color image forming mode for forming the image in multiple colors can be selected, said display of the warning is performed in response to selection of said color image forming mode, and the input by the operation after the display of the warning is disabled.

34. The method of controlling the image forming apparatus according to claim 32, wherein said input by the operation disabled after said display of the warning is an input by the operation for instructing start of the image reproducing operation.

35. The method of controlling the image forming apparatus according to claim 32, wherein a third party is notified of the fact that an operator performs an operation relating to the reproduction of the color image in response to said input by the operation.

36. A method of controlling an image forming apparatus reproducing an original image in multiple colors and allowing a predetermined input operation relating to the reproduction of the color image, comprising:

displaying a predetermined warning and disabling the image reproducing operation in response to an input by said operation relating to the reproduction of the color image without regard to whether the original image is a specified image or not; and enabling the image reproducing operation in response to a confirmation input representing confirmation of the displayed warning by an operator.

37. The method of controlling the image forming apparatus according to claim 36, wherein a color image forming mode for forming the image in multiple colors can be selected, said display of the warning is performed and the image reproducing operation is disabled in response to selection of said color image forming mode.

38. The method of controlling the image forming apparatus according to claim 36, wherein a third party is notified of the fact that an operator performs an operation relating to the reproduction of the color image in response to said input by the operation.

39. The method of controlling the image forming apparatus according to claim 36, wherein a third party is notified of the fact that the operation is the reproduction of the color image.

40. A method of controlling an image forming apparatus allowing selection of a color image forming mode for forming an image in multiple colors, and being capable of reproducing the original image in multiple colors when said color image forming mode is selected, comprising the step of:

notifying a third party other than an operator of the fact that the operator is performing the color image forming operation only in response to selection of said color image forming mode or said color image reproducing operation.

41. The method of controlling the image forming apparatus according to claim 40, wherein a signal representing the fact that the color image forming operation is being performed is sent to display means independent of said image forming apparatus in response to selection of said color image forming mode or said color image reproducing operation.

42. The method of controlling the image forming apparatus according to claim 40, wherein it is determined whether the original is a copy-protected material, and the third party other than the operator is notified of the fact that the original is the copy-protected material when said original is the copy-protected material.

* * * * *